June 17, 1952     B. K. SLONNEGER     2,600,583
SCANNING MEANS

Filed Jan. 14, 1950                                        2 SHEETS—SHEET 1

INVENTOR
BRUCE K. SLONNEGER
BY Carl Beust
Henry Silfries
HIS ATTORNEYS

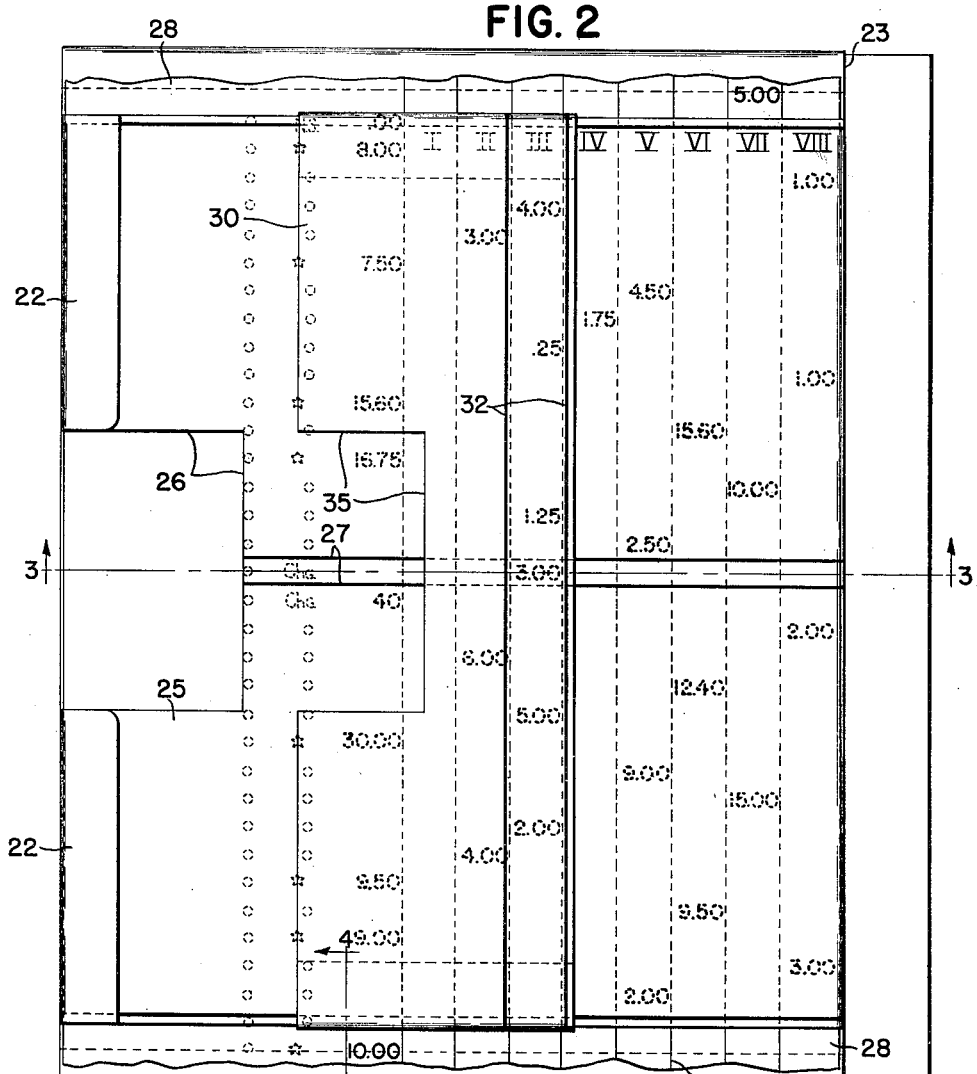
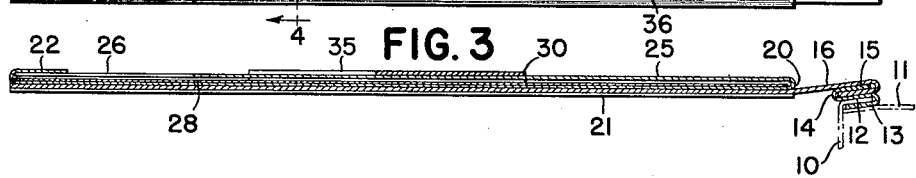
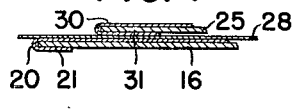

Patented June 17, 1952

2,600,583

UNITED STATES PATENT OFFICE 2,600,583

SCANNING MEANS

Bruce K. Slonneger, Dayton, Ohio, assignor to
The National Cash Register Company, Dayton,
Ohio, a corporation of Maryland Application July 14, 1950, Serial No. 173,759

8 Claims. (Cl. 281—1)

This invention relates to improvements in scanning devices to aid an operator in reading items from a plurality of columns of a detail strip produced by a cash register or accounting machine.

Certain types of cash registers and accounting machines print a detail strip on which related data is printed in the same column, and a plurality of columns are printed, the number of columns depending on the number of classifications required. At the end of a business period, such as a day, the proprietor analyzes the day's business by adding the items of each column, or otherwise reads the data from the detail strip. A machine adapted for such a system is shown and described in United States Patent No. 2,443,652, issued to Edward J. Carey and John B. Geers on June 22, 1948, and the present invention is illustrated in connection with such a machine.

The machine illustrated and described in said patent is adapted for use in filling stations, and the data printed on the detail strip is divided into nine columns, which data is analyzed at the end of the day in the manner described in columns 61 and 62 of said patent.

The present invention is provided to facilitate such analysis and provides a means for selecting a line and a column from the detail strip for entries into the machine. The device is conveniently attached to the cabinet of the machine, at its left side, where it can be easily manipulated and read.

The principal object of the invention is to provide a scanning means having means for selecting a line of printed data from a plurality of lines and a movable means to select a column of data from a plurality of columns of data, and an opening in the means through which the record material on which the data is printed can be fed manually.

It is a specific object of the invention to provide a scanning means which can be readily attached to an accounting machine to facilitate reading data from a printed record and entering such data into the accounting machine.

It is a further object of the invention to provide a scanning means of transparent material to facilitate selection of data to be analyzed.

With these and incidental objects in view, the invention includes certain novel features of construction and combinations of parts, a preferred form of which is hereinafter described with reference to the drawings which accompany and form a part of this specification.

Of said drawings:

Fig. 2 is a plan view of the scanning device.

Fig. 3 is a cross sectional view taken on line 3—3 of Fig. 2, looking in the direction of the arrows.

Fig. 4 is a detail cross sectional view taken on line 4—4 of Fig. 2, looking in the direction of the arrows.

General description

Figure 1:
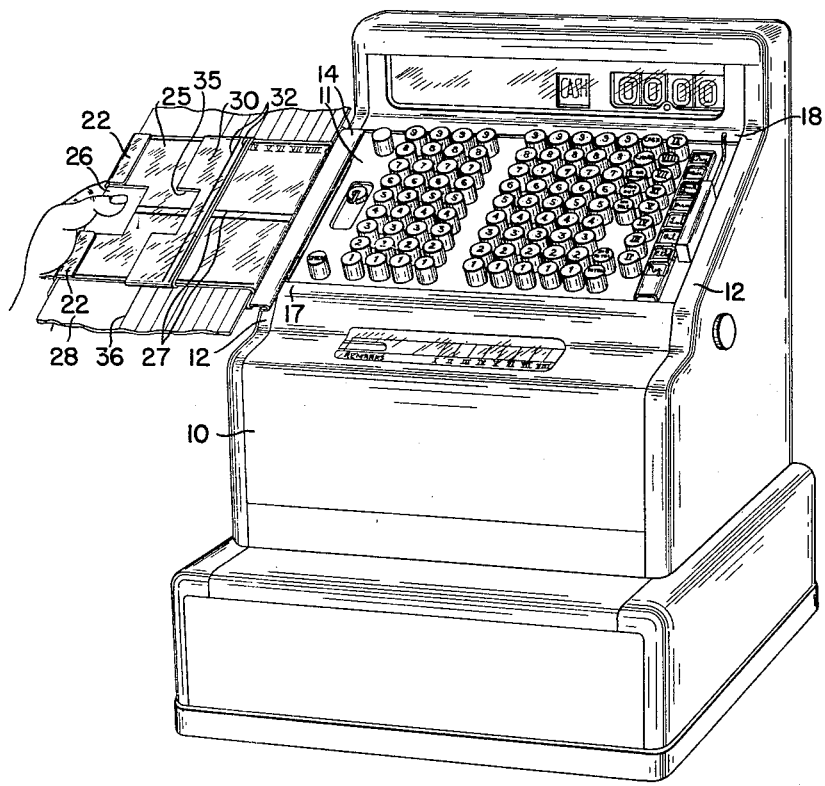
Fig. 1 is a perspective view showing the novel scanning device attached to a typical cash register.

As described in the above-mentioned Carey and Geers patent, cash registers record data on what is known as an audit strip, and at the end of a day, or other selected period of time, the proprietor analyzes the audit strip. In machines such as that illustrated in said patent, the data is printed in columns, each column representing a classification of merchandise or a department. The data is recorded on the audit strip as the sales are recorded, which results in the entries being dispersed in the various columns in irregular order. With long audit strips, the auditing is somewhat difficult, due to the fact that it is difficult to follow down the columns on the strip to pick out the desired entries.

The present invention simplifies the scanning operation and includes a holder for the audit strip that is easily attached to the cabinet of the cash register at a convenient location. The holder is provided with a transparent cover under which an audit strip is placed, and the cover is ruled with two guide lines in a direction extending across the audit strip. The cover is also provided with an opening for the thumb of the operator, by means of which the audit strip is moved to position the desired line of data between the guide lines. A slide is also provided and is shiftable on the cover in the direction of the lines of printed data. This slide also is made of transparent material, so that the entries on the holder are visible at all times. The slide is ruled with two vertical lines, and the space between the lines is equal to the width of a column.

After the audit strip is placed on the holder, the slide is moved laterally to bring its ruled lines in alignment with the sides of the column of items to be analyzed. Thereafter, the operator shifts the audit strip with his thumb to feed the desired line of data between the ruled lines on the holder. This frames the item to be analyzed between the lines on the cover and the lines on the slide, and, since both the cover and the slide are transparent, the item being considered appears in a square and is easily readable without being confused with the other entries on the strip. After the item being considered has been properly entered into the machine, the operator feeds the audit strip upwardly to bring the next entry into the frame for analyzing.

To give the slide sufficient stability and render it easy to manipulate, it is made of a width that, when moved to the left to select the leftmost column of data, it would cover the thumb opening. To prevent such interference, the slide is notched, so that, when in such position, the notch registers with the thumb opening of the cover.

The base of the holder is made of metal for stability, and, in order to provide the smoothest possible surface for the audit strip to slide on when fed by the operator's thumb, a plastic sheet is secured to the face of the metal holder, which offers a minimum of friction for the audit strip, thus rendering the feeding operation easier.

*Detailed description*

As above mentioned, the novel scanner device is illustrated herein as attached to a machine disclosed in the above-mentioned Carey et al. patent. The machine is enclosed in a cabinet 10, and, to provide an opening for the keyboard supporting plate 11, the side of the cabinet is flanged inwardly to form a finish strip 12 extending along each side of the keyboard. The present device is preferably attached to the left-hand side of the keyboard by inserting a flange 13 of a clip 14 between the keyboard support plate 11 and the strip 12. The clip 14 is formed to fit the strip 12 snugly and is bent back to form a flange 15 for engaging the scanning device holder 16. The right-hand edge of the holder is bent inwardly to snugly fit the clip 14 in the manner illustrated in Fig. 3. The clip 14 is of a length sufficient to fit between flanges 17 and 18 of the cabinet, and the holder 16 is made of any desired length, which, as illustrated herein, extends a short distance beyond the flange 17 of the cabinet 10.

The top surface of the holder 16 is covered with a sheet 20 of plastic material, having its top and bottom edges folded around the holder in the shape of flanges 21 (Fig. 4). The left-hand edge of the sheet 20 is formed inwardly to provide flanges 22. Thus the sheet 20 is held on the holder 16 by flanges 21, which can be held against shifting, if desired, by Scotch tape or other adhesive.

The sheet 20 is folded at its right edge and formed back over its top to provide a cover 25, and the left-hand end of the cover 25 is positioned beneath the flanges 22, which holds the cover 25 in position. The sheet 20 and the cover 25 form an envelope, open at the top and bottom edges, in which record material is inserted in the manner hereinafter described. The flanges 21 at the top and bottom of the holder 16 provide means for securing the envelope to the holder. The cover 25 is provided with a notch 26 at its left-hand end to provide a rectangularly-shaped notch for a purpose described later. The cover 25 is provided with two ruled lines 27, opaque in color, such as black, and these lines are located centrally in relation to the notch 26 and provide a means to select a line of printed data to be scanned.

The printed data is recorded on an audit strip 28 by an accounting machine, such as that described in the above-mentioned Carey et al. patent. When the audit strip is taken from the accounting machine, its end is inserted between the sheet 20 and the cover 25 in a position wherein the line of printed data to be scanned lies between the ruled lines 27. After the end of the audit strip reaches the notch 26, the operator can feed the audit strip upwardly or downwardly by inserting his thumb into the notch 26, where the audit strip is exposed, and sliding the audit strip in the necessary direction. This operation is illustrated in Fig. 1, where the operator's thumb is shown in position in the notch 26 to slide the audit strip to locate the desired printed item between the lines 27.

As illustrated in Fig. 2 herein, and in Fig. 3 of the above-mentioned patent, the items are recorded in nine columns, the left-hand column representing totals of certain transactions, and the other eight columns having classified amounts. For convenience, these columns are given numerals in the form of Roman numerals I to VIII. To assist in identifying the data related to the columns, the cover 25 has the roman numerals I to VIII marked thereon. When the audit strip is in position beneath the cover 25, the numerals I to VIII are in alignment with the printed columns, thus making the selection of a desired column for analyzing more facile, since, if classification I is to be analyzed, the column headed by I is followed through.

The headings I to VIII provide means to identify a column, but the operator can still be confused in glancing down the column, and his eyes might stray into the wrong column, resulting in error in making analyzing records. To avoid this, a slide 30 is provided, which is bent under at the top and bottom edges in the form of flanges 31, which flanges form channels slidably fitting the top and bottom edges of the cover 25. As shown in Fig. 2, the cover 25 is shorter than the sheet 20, said sheet being notched before being formed to provide the cover 25. The slide 30 is made of transparent plastic material and is provided with two opaque lines 32. When, for example, it is desired to analyze the data in column III, the slide is moved until the Roman numeral III appears between the ruled lines 32, as illustrated in Fig. 2. When the slide is so positioned, and when the audit strip is in position to position a line thereof between the lines 27, the item to be entered is framed in a square by the two sets of ruled lines. See the item "3.00" in Fig. 2, which is framed on its side by lines 32 and at the top and bottom by the lines 27. The item and the lines are clearly visible because the cover 25 and the slide 30 are transparent.

After the column-selecting slide is properly positioned, the items of the column can be read off one at a time by feeding the audit strip by means of the thumb of the operator in the manner illustrated in Fig. 1. For example, in Fig. 2, after the item "3.00" has been properly entered, the audit strip is fed upwardly until the next item in column III—namely, "5.00"—is framed by the rulings 27 and 32. In this manner, every item of column III is entered and totalized before going to the next column.

When the left-hand column is being read, the slide 30 is moved into a position where the notch 26 might be covered. To avoid this, the slide 30 is provided with a notch 35, which registers with the notch 26 when the slide 30 is in said position.

In its operation, the scanning device provides a means for "pin-pointing" each item to be read and in this manner speeds the work of analyzing the audit strip and makes the analyzing operation less likely to result in error caused by the confusion of having the various items promiscuously entered in the columns. When used in a machine of the above-mentioned patent, the audit paper is ruled with lines 36 (Figs. 1 and 2), but this is not necessary with applicant's novel device. This eliminates the necessity of using ruled paper, which is more costly than unruled paper.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a device of the class described, the combination of a holder for record material having lines and columns of data recorded thereon, a transparent member comprising a bottom and a cover secured to the holder and arranged to receive the record material beneath the transparent cover, opaque ruled lines on the transparent cover disposed at right angles to the columns of data, an opening in the cover through which the record material is manually fed to locate a selected line from a selected column of data into a predetermined position in respect to the ruled lines to visually isolate a selected datum or line of data from the data on the record material, a transparent slide movably mounted on the cover at the top and bottom thereof and laterally movable over the face of the cover, and opaque ruled lines on the transparent slide disposed at right angles to the lines on the cover to visually isolate a datum in a selected column of data, whereby the ruled lines on the cover and the ruled lines on the slide frame a selected datum.

2. In a device of the class described, the combination of a holder for record material having lines and columns of data recorded thereon, a transparent member comprising a bottom and a cover on the holder adapted to receive the record material beneath the cover, indexing lines on the cover comprising two ruled lines spaced apart a distance equal to the line-spacing of the data and arranged parallel to the lines of data, an opening in the cover to facilitate line-spacing the data in relation to the indexing means whereby a selected line of data can be located between the indexing lines, a transparent slide movable on the face of the cover in a lateral direction, and indexing lines on the slide extending parallel with the columns of data and at right angles to the indexing lines on the cover, said slide laterally movable on the cover into a position wherein a column of data is located between the indexing lines to visually isolate the selected datum between the indexing lines on the cover.

3. In a device of the class described, the combination of a rigid holder for receiving record material having lines and columns of data recorded thereon, a transparent envelope secured to the face of the holder, said envelope being open at the top and bottom thereof to receive the record material and adapted to permit the record material to be fed therethrough, indexing means on the cover of the envelope coordinated with the lines of data so as to visually isolate a line of data when the line of data is fed into juxtaposition thereto, an indexing slide movably mounted on the envelope and movable in relation thereto in a lateral direction, and indexing means on the slide positionable in relation to the indexing means on the cover so as to visually isolate a datum on the record material.

4. In a device of the class described, the combination of a rigid holder for receiving record material having lines and columns of data thereon, a transparent envelope having open ends at the top and bottom thereof and closed sides, means on the top and bottom edges of the envelope for securing the envelope to the rigid holder, said envelope adapted to receive said record material through the said openings and said record material adapted to be fed through the envelope, and parallel lines on the cover of the envelope extending laterally across the envelope, said lines spaced apart a distance equal to the height of the printed data, and said record material being adapted to be fed in relation to the said parallel lines whereby a line of printed data can be moved therebetween to visually isolate the line of printed data from the other data on the record material.

5. In a device of the class described, the combination of a rigid holder for receiving record material having lines and columns of data thereon; a transparent envelope having open ends at the top and bottom thereof and closed sides; means on the top and bottom edges of the envelope for securing the envelope to the rigid holder, said envelope adapted to receive said record material through the said openings and said record material adapted to be fed through the envelope; parallel lines on the cover of the envelope extending laterally across the envelope, said lines spaced apart a distance equal to the height of the printed data, and said record material being adapted to be fed in relation to the said parallel lines whereby a line of printed data can be moved therebetween to visually isolate the line of printed data from the other data on the record material; a transparent slide movably mounted on the envelope and movable laterally thereon; and parallel lines on the transparent slide movable relatively to the columns of data on the record material to visually isolate a column of data from the other columns of data on the record material, whereby the parallel lines on the cover and the parallel lines on the slide will visibly isolate a selected datum.

6. In a device of the class described, the combination of a rigid holder for receiving record material having lines and columns of data thereon; a transparent envelope having open ends at the top and bottom thereof and closed sides; means on the top and bottom edges of the envelope for securing the envelope to the rigid holder, said envelope adapted to receive said record material through the said openings and said record material adapted to be fed through the envelope; parallel lines on the cover of the envelope extending laterally across the envelope, said lines spaced apart a distance equal to the height of the printed data, and said record material being adapted to be fed in relation to the said parallel lines whereby a line of printed data can be moved therebetween to visually isolate the line of printed data from the other data on the record material; a transparent slide movably mounted on the envelope and movable laterally thereon; parallel lines on the transparent slide movable relatively to the columns of data on the record material to visually isolate a column of data from the other columns of data on the record material, whereby the parallel lines on the cover and the parallel lines on the slide will visibly isolate a selected datum; and an opening in the cover of the envelope to give access to the record material for manually line-spacing the record material.

7. In a device of the class described, the combination of a rigid holder for receiving record material having lines and columns of data thereon; a transparent envelope having open ends at the top and bottom thereof and closed sides; means on the top and bottom edges of the envelope for securing the envelope to the rigid holder, said envelope adapted to receive said record material through the said openings and said record material adapted to be fed through the envelope; parallel lines on the cover of the envelope extending laterally across the envelope, said lines spaced apart a distance equal to the height of the printed data, and said record material being adapted to be fed in relation to the said parallel lines whereby a line of printed data can be moved therebetween to visually isolate the line of printed data from the other data on the record material; a transparent slide movably mounted on the envelope and movable laterally thereon; parallel lines on the transparent slide movable relatively to the columns of data on the record material to visually isolate a column of data from the other columns of data on the record material, whereby the parallel lines on the cover and the parallel lines on the slide will visibly isolate a selected datum; an opening in the cover of the envelope to give access to the record material for manually line-spacing the record material; and means on the rigid holder to secure the holder to an accounting machine.

8. In a device of the class described, the combination of a rigid holder for receiving record material having lines and columns of data thereon; a transparent envelope having open ends at the top and bottom thereof and closed sides; means on the top and bottom edges of the envelope for securing the envelope to the rigid holder, said envelope adapted to receive said record material through the said openings and said record material adapted to be fed through the envelope; parallel lines on the cover of the envelope extending laterally across the envelope, said lines spaced apart a distance equal to the height of the printed data, and said record material being adapted to be fed in relation to the said parallel lines whereby a line of printed data can be moved therebetween to visually isolate the line of printed data from the other data on the record material; a transparent slide movably mounted on the envelope and movable laterally thereon; parallel lines on the transparent slide movable relatively to the columns of data on the record material to visually isolate a column of data from the other columns of data on the record material, whereby the parallel lines on the cover and the parallel lines on the slide will visibly isolate a selected datum; an opening in the cover of the envelope to give access to the record material for manually line-spacing the record material; means on the rigid holder to secure the holder to an accounting machine; and means on the rigid holder to secure the holder to a stationary object.

BRUCE K. SLONNEGER.

REFERENCES CITED

The following references are of record in the file of this patent:

UNITED STATES PATENTS

| Number | Name | Date |
|---|---|---|
| 421,108 | Otis | Feb. 11, 1890 |
| 2,188,210 | Smith | Jan. 23, 1940 |
| 2,215,833 | Large | Sept. 24, 1940 |
| 2,420,947 | Goodspeed | May 20, 1947 |

FOREIGN PATENTS

| Number | Country | Date |
|---|---|---|
| 671,905 | Germany | Feb. 16, 1939 |